Sept. 4, 1956  H. POMERNACKI  2,761,560
AUTOMATIC GEAR SIZE CHECKING APPARATUS
Filed May 17, 1954  3 Sheets-Sheet 1
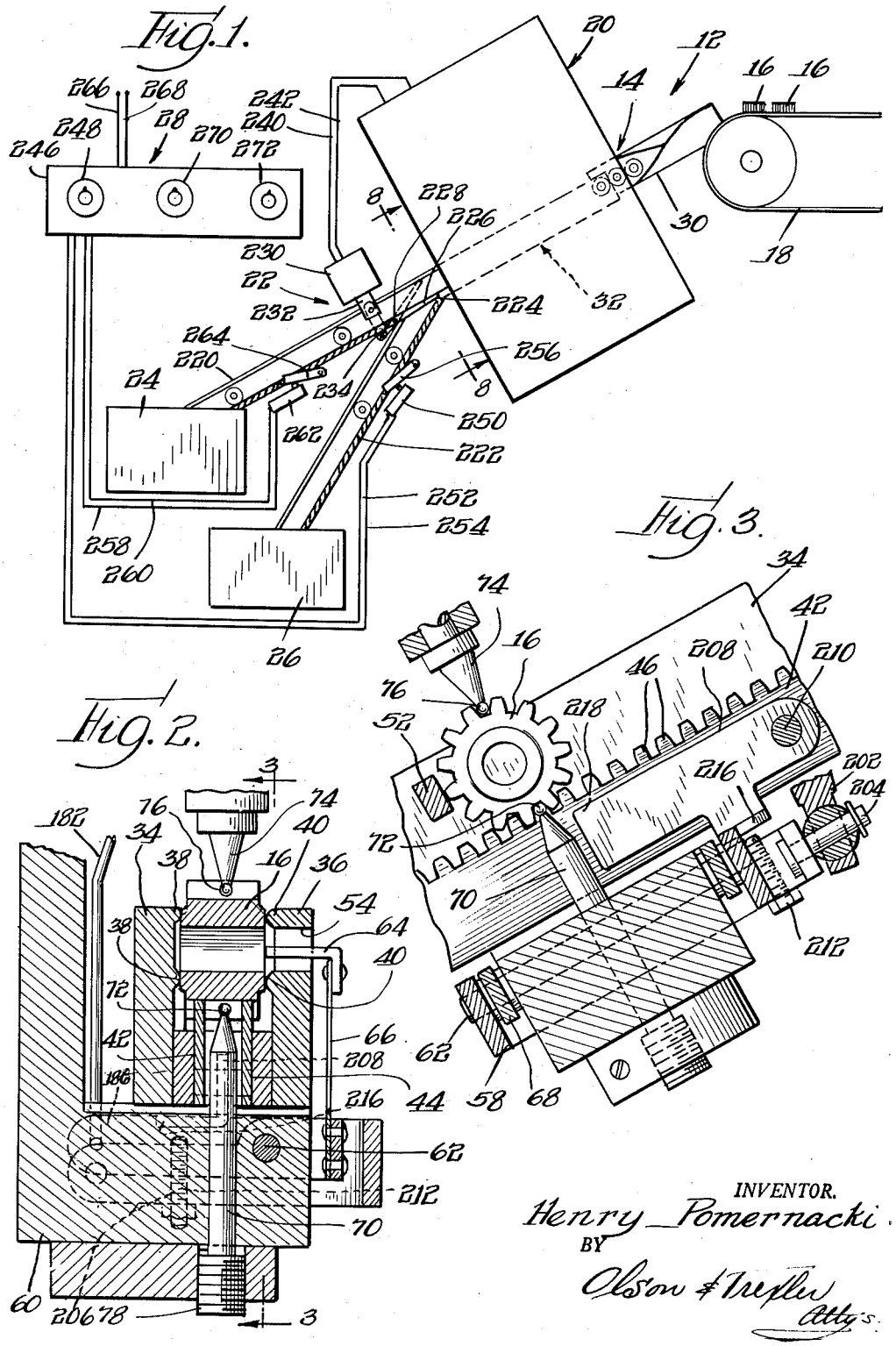
INVENTOR.
Henry Pomernacki
BY
Olson & Trexler
Atty's Sept. 4, 1956 H. POMERNACKI 2,761,560
AUTOMATIC GEAR SIZE CHECKING APPARATUS
Filed May 17, 1954 3 Sheets-Sheet 2
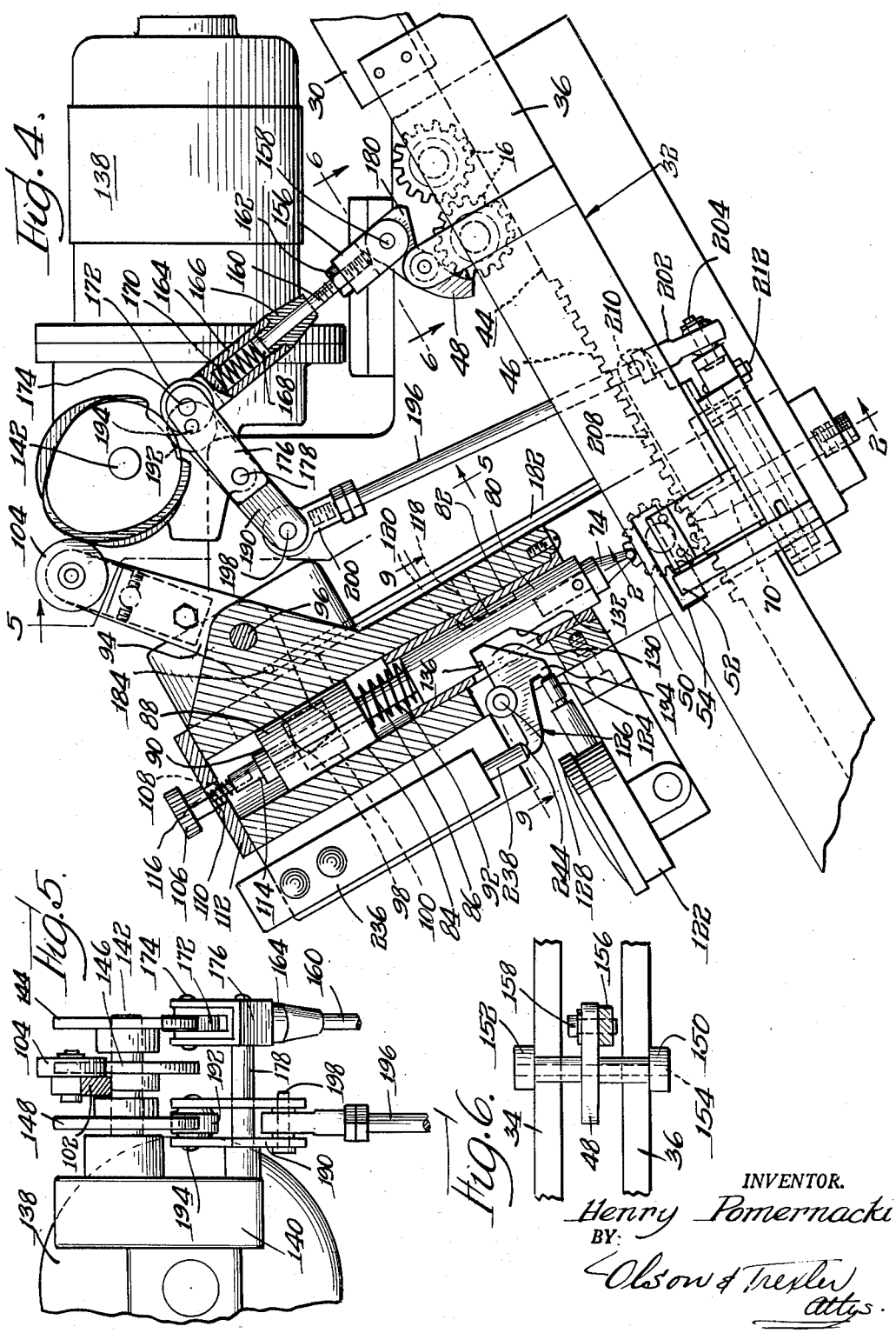
INVENTOR.
Henry Pomernacki
BY
Olson & Trexler
attys.

Sept. 4, 1956 H. POMERNACKI 2,761,560
AUTOMATIC GEAR SIZE CHECKING APPARATUS
Filed May 17, 1954 3 Sheets-Sheet 3
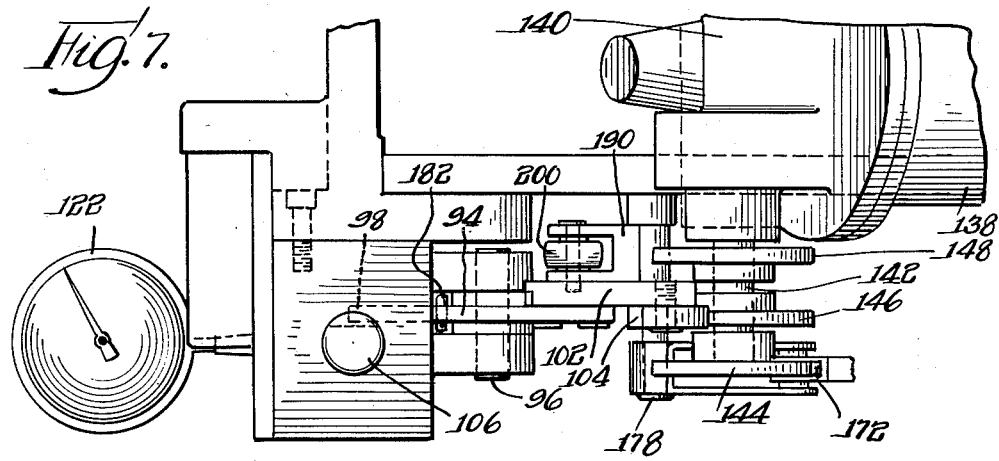
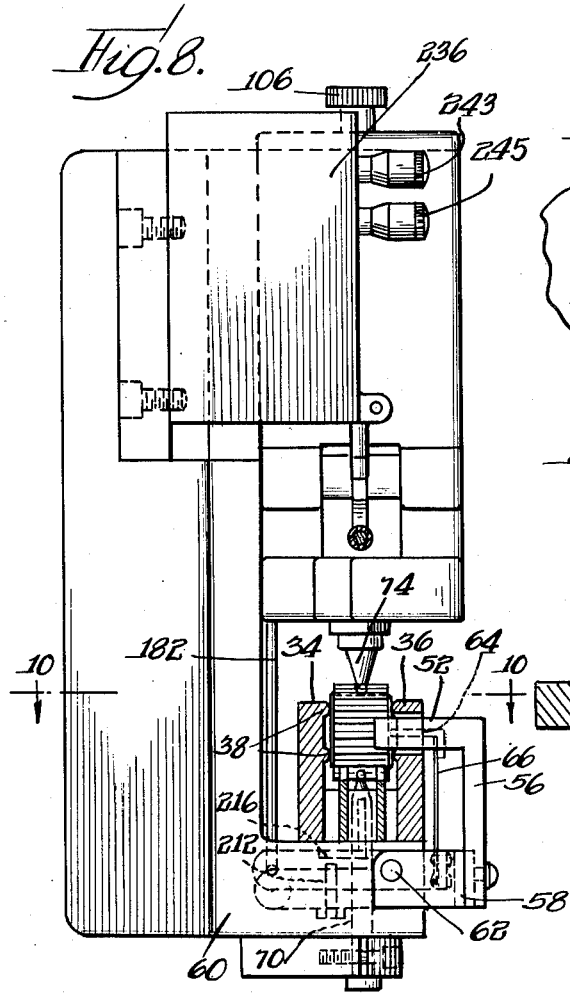
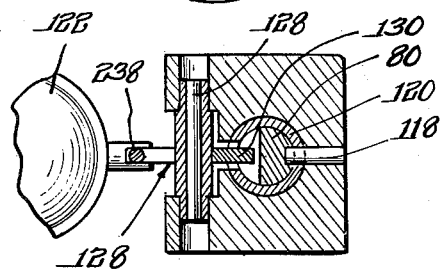
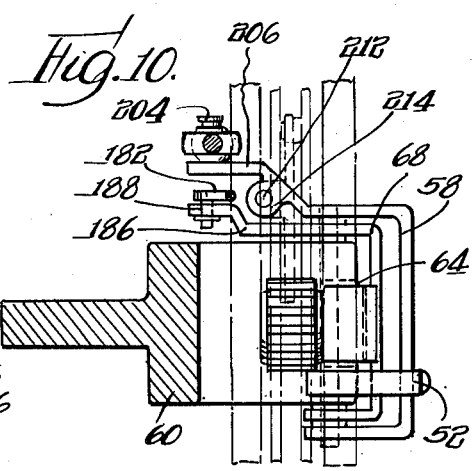
INVENTOR.
Henry Pomernacki
BY
Olson & Trexler
attys.

006F United States Patent Office 2,761,560
Patented Sept. 4, 1956

2,761,560

AUTOMATIC GEAR SIZE CHECKING APPARATUS

Henry Pomernacki, Chicago, Ill., assignor to Illinois Tool Works, Chicago, Ill., a corporation of Illinois Application May 17, 1954, Serial No. 430,360

11 Claims. (Cl. 209—88)

The present invention relates to a novel gear checking apparatus and more particularly to a novel apparatus for checking gears and similar workpieces as to size.

It is well known that gears and like articles are expensive items to manufacture. An important part of the expense involved in manufacturing gears results from the necessity of checking the gears as to size since with the checking apparatus heretofore known each gear is individually handled by an operator who mounts the gear in the checking apparatus, then actuates the testing apparatus and finally removes the tested gear. This rather slow and tedious gear checking procedure makes the cost of labor for the checking operation unnecessarily high. The cost of acceptable gears is further increased as a result of the fact that an undue number of faulty and unacceptable gears may be formed before the results of the checking operation indicate that the gear forming or shaping apparatus requires adjustment.

An important object of the present invention is to provide a novel apparatus for rapidly and automatically checking or testing a series of gears and like articles without requiring handling of the gears by an operator.

Another object of the present invention is to provide a novel apparatus for automatically checking gears and like articles coming from a forming or shaping machine and for automatically stopping the machine when the results of the checking operation indicate the necessity for an adjustment of the machine.

A further object of the present invention is to provide a novel apparatus for automatically testing a series of gears or like articles and for automatically separating acceptable gears from any faulty gears.

Still another object of the present invention is to provide a novel apparatus capable of continuously receiving gears or like articles from a forming or shaping machine and for automatically checking such articles and separating acceptable articles from unacceptable articles.

A still further object of the present invention is to provide a novel automatic gear checking apparatus which is of simple and rugged construction and which is capable of accurately checking gears as to size.

Other objects and advantages of the present invention will become apparent from the following description and the accompanying drawings wherein:

Fig. 1 is a diagrammatic elevational view showing an apparatus embodying the principles of this invention;

Fig. 2 is an enlarged fragmentary cross sectional view taken along line 2—2 in Fig. 4;

Fig. 3 is a fragmentary cross sectional view taken along line 3—3 in Fig. 2;

Fig. 4 is an enlarged fragmentary elevational view which is partially broken away to show certain features of the novel checking apparatus in greater detail;

Fig. 5 is a fragmentary cross sectional view taken along line 5—5 in Fig. 4;

Fig. 6 is a fragmentary cross sectional view taken along line 6—6 in Fig. 4;

Fig. 7 is a fragmentary plan view of a portion of the novel gear checking apparatus;

Fig. 8 is an enlarged fragmentary cross sectional view taken along line 8—8 in Fig. 1;

Fig. 9 is a fragmentary cross sectional view taken along line 9—9 in Fig. 4; and Fig. 10 is a fragmentary cross sectional view taken along line 10—10 in Fig. 8.

Referring now more specifically to the drawings wherein like parts are designated by the same numerals throughout the various figures, an apparatus 12 embodying the principles of the present invention is diagrammatically shown in Fig. 1. This apparatus includes chute means 14 inclined at an acute angle from the horizontal and adapted to receive a series of gears 16 from an endless conveyor 18. Preferably the conveyor is positioned to receive the gears directly from a forming machine such as a gear shaving machine, not shown. The gears are directed by the chute means to a checking section 20 of the apparatus and then to separating means 22 which is operable to direct acceptable gears along one path of travel and rejected gears along another path of travel. The acceptable gears may be directed to any suitable receiving means such as a container 24 and the rejected gears are directed to a similar receiving means such as a container 26. Alternatively, conveyor means, not shown, may be provided in place of each of the containers. The apparatus 12 also includes electrical control means 28 which is operable in response to the results of the testing or checking operation to shut off the gear forming apparatus automatically in the event that the results of the checking operation indicate the necessity of an adjustment in the forming apparatus.

As shown best in Figs. 1, 2, 4 and 8 the chute means includes a twisted section 30 which turns gears received therein one-quarter of a turn and delivers the gears to a chute section 32. The chute section 32 includes a pair of side plates 34 and 36 respectively having a plurality of longitudinally extending ribs 38 and 40 for guiding the gears passing therebetween without undue frictional contact with the gears. The gears entering between the side plates 34 and 36 rest upon the upper edges of a pair of spaced parallel rack members 42 and 44, which rack members are provided with teeth 46 adapted to mesh with the teeth of the gears 16 for the purpose set forth hereinbelow. Downward movement of the gears is initially arrested by a lever 48 which functions in a manner to be described to permit the gears to advance one at a time to a checking position indicated at 50 in Fig. 4.

In order to locate the gear at the checking position 50, a stop finger 52 projects through an opening 54 in the side plate 36 for arresting downward movement of the gear. This stop finger is connected by an arm 56 to a U-shaped bracket 58 which is pivotally mounted to the apparatus frame 60 by means of a pin 62 so that upon pivotal movement of the bracket by means described below, the stop pin 52 will be withdrawn to permit further downward movement of the gear after the checking operation has been completed. In addition, means is provided at the gear checking position for pressing the gear against the ribs 38 of the side plate 34 to insure against tilting of the gear between the side plates 34 and 36. This means includes a pressure plate 64 which extends through the elongated aperture 54 in the side plate 36 and which is adapted to engage the gear at opposite sides of the central opening through the gear. The pressure plate 64 is carried at the upper end of a flat flexure spring 66 so that the pressure plate is yieldably biased into engagement with the gear. The lower end of the spring 66 is connected with a generally U-shaped bracket 68 that is also pivotally mounted by means of the pin 62 so that upon pivotal movement of the bracket 68 by the means described below, the pressure pad or plate 64 is withdrawn from the gear.

The gears are checked for size in the apparatus of this invention by utilizing a pair of oppositely disposed fingers having rounded or ball tips adapted to enter tooth spaces and engage the gear at any desired point such as at the pitch diameter. By utilizing such fingers which engage the gear with point contact, rejects of acceptable gears as a result of dirt or slight nicks on the gear teeth are reduced to a minimum. More specifically, by referring particularly to Figs. 2, 3, 4, and 8 it is seen that the apparatus is provided with a fixed finger 70 having a rounded or ball tip 72 and a movably mounted finger 74 having a rounded or ball tip 76, which fingers are in axial alignment. It should also be noted that the tip 72 is in alignment with a pair of oppositely disposed teeth on the rack members 42 and 44 so that the rack mmebers serve to control the rotation of the gears rolling downwardly thereon so that the tooth spaces of the gears are properly located for entry of the tips of the fingers when the gears are arrested at the checking position. It is thus seen that the rack members, which may be economically stamped from sheet metal or any other desirable material, provide a simple yet highly efficient means for automatically positioning the gears relative to the checking fingers. Furthermore, with this structure the apparatus may be easily adapted for checking gears of different sizes merely by replacing the illustrated rack members with other rack members of a different size and, if necessary, by adjusting the height of the fixed finger 70. The finger may be adjusted merely by turning since it is mounted in the frame structure 60 by means of a threaded member 78. In addition, the stop finger 52 may be adjustably mounted on the bracket 58 so that the apparatus can be adjusted to accommodate gears of different diameters.

The checking finger 74 is carried by a plunger 80 slidably disposed within an elongated bushing 82, which bushing is mounted within a bore 84 of an upstanding portion of the apparatus frame. The plunger includes an upwardly extending shank 86 of reduced diameter on which is slidably disposed a block 88. A headed member 90 is threaded into the upper end of the shank 86 for retaining the block 88 and a compression spring 92 is disposed on the shank for normally resiliently biasing the plunger downwardly relative to the block 88 until the headed member 90 engages the upper end of the block. The plunger is reciprocated through a gear checking cycle by means including a lever 94 which is pivotally mounted to the apparatus frame by a pin 96. The lever includes an end portion 98 which extends into a suitably formed slot 100 in the block 88. At the opposite end of the lever there is adjustably mounted an arm 102 which carries a cam follower roller 104. Thus, as the lever 94 is pivoted in a counterclockwise direction, as viewed in Fig. 4, by the means which will be described below, the plunger 80 and the checking finger 74 are moved downwardly to check a gear and upon clockwise pivotal movement of the lever the plunger and checking finger 74 are retracted or moved upwardly. It should be noted that the compression spring 92 provides a resilient connection between the block 88 and the plunger 80 so that upon downward or advanced motion of the plunger the checking finger 74 will be resiliently urged against the gear. Preferably adjustable means is provided for limiting the downward stroke of the plunger 80 so that the minimum distance obtainable between the tips of the fingers 70 and 74 is approximately the distance which will be obtained when the gear being checked is of an acceptable size and usually slightly less than the minimum distance obtained when the gear is of an acceptable size. This is done in order to prevent the finger 74 from being pressed against the gear with sufficient force to mar or dent the gear. The adjustable means just mentioned includes a knob 106 having a threaded shank 108 extending through an aperture 110 in a cover plate 112 of the apparatus frame structure. The shank 108 is threaded into an upstanding portion 114 of the member 90 so that the knob reciprocates with the plunger 80 and limits downward movement of the plunger by engaging the cover plate 112. A compression spring 116 is disposed on the shank 108 for frictionally locking the knob 106 in any desired adjusted position as will be understood. In order to prevent the plunger 80 from turning a key 118 is mounted in the apparatus frame and extends into an axially extending slot 120 formed in the side of the plunger.

In order to indicate the results of the checking operation a dial indicator 122 of any known construction having a spring biased plunger 124 is suitably mounted on the apparatus frame. A lever 126 is pivotally mounted to the frame by means of a pin 128 and includes a finger portion 130 which extends laterally into a suitable recess 132 formed in the plunger 80. The lever also includes a finger portion 134 which is disposed for engagement with the spring-biased plunger 124 of the dial indicator. The recess 132 is provided with a radially extending wall 136 at its upper end so that upon downward movement of the plunger 80 the wall 136 engages the lever finger portion 130 to pivot the lever in a clockwise direction as viewed in Fig. 4 and actuate the spring-biased plunger 124 of the dial indicator.

In order to actuate the various movable elements of the checking apparatus thus far described, a suitably mounted electric motor 138 is provided to which is connected a speed reducing mechanism 140. The speed reducing mechanism includes an output shaft 142 having fixed thereon cams 144, 146 and 148. The cam 144 is operable to actuate the gear retaining lever 48 through a linkage mechanism shown in Figs. 4, 5, 6 and 7. More specifically, the lever 48 is pivotally mounted between a pair of upstanding bracket arms 150 and 152 by means of a pin 154. A link 156 is pivotally connected to the upper or rear end of the lever 48 by means of a pin 158 and an elongated stud member 160 is adjustably threaded into the link and locked in position by means of a nut 162. The upper end of the stud member slidably extends into a hollow body portion of a link 164 and is retained therein by means of a cap member 166 which is threaded into the end of the hollow link member and engages the head 168 of the stud. A compression spring 170 is disposed within the hollow link member for yieldably biasing the stud toward its fully extended position. A roller 172 which is engageable with the cam 144 is connected to the upper end of the link 164 by means of a pin 174. In addition, a bifurcated lever 176 is pivotally connected to the pin 174 and is also pivotally mounted to the apparatus frame by means of a pin 178. With this structure, it is seen that as the roller 172 rides up on a high portion of the cam 144 the linkage mechanism is actuated so that the lever 48 is pivoted in a clockwise direction as viewed in Fig. 4 to release the foremost gear. At the same time, a downwardly projecting rear portion 180 of the lever 48 engages the next gear to prevent it from rolling down the chute. The resilient connection between the stud 160 and the link 164 prevents injury to either the linkage mechanism or the gear when the lever portion 180 is moved into engagement with the gear.

The cam 146 is disposed for engagement with the roller 104 carried by the lever 94 and is suitably formed to actuate the lever 94 and thus the checking finger 74 in predetermined timed relationship with the movement of the lever 48. In addition, this cam serves to actuate the above described U-shaped bracket 68 and the gear positioning pressure pad 64 carried thereby. More specifically, by referring to Figs. 4, 8, and 10 it is seen that the apparatus is provided with a connecting rod 182 having its upper end pivotally secured to the lever 94 as at 184 and having its lower end pivotally secured to an extension 186 of the bracket 68 as at 188. With this structure, the bracket 68 is pivoted to move the pressure pad 64 into engagement with the gear when the lever 94 is pivoted to move the checking finger 74 downwardly. Of course this structure also operates to withdraw the pressure pad from the gear upon upward movement of the checking finger 74.

The cam 148 serves to actuate the above described generally U-shaped bracket 58 carrying the stop finger 52 through the linkage mechanism which will now be described. This linkage mechanism includes a lever 190 which is pivotally mounted on the pin 178 as shown in Figs. 4, 5, and 7. A roller 192 is mounted at one end of the lever 190 by means of a pin 194 for engagement with the cam 148. It is understood that suitable spring means, not shown, should be provided for biasing the lever 190 so that the roller 192 is always maintained in contact with the cam 148 and that similar spring means should be provided for biasing the above described levers 94 and 176 so that their respective rollers are always maintained in contact with their associated actuated cams. These spring means may be in the form of tension springs connected between the levers and the apparatus frame in a known manner and, therefore, need not be shown or further described. To the opposite end of the lever 190 there is connected a rod 196 by means of a pin 198 and a suitable swivel connecting device 200. Another swivel connecting device 202 is mounted on the lower end of the rod 196 and receives a pin 204 which is carried by an extension 206 of the bracket 58. With this structure it is seen that as the roller 192 rides up on the high portion of the cam 148 the lever 190 will be pivoted in a clockwise direction, as viewed in Fig. 4, and the bracket 58 will be pivoted so as to swing the stop finger outwardly to permit a gear to pass. It is, of course, understood that the cam 148 is properly formed to actuate the stop finger 52 in predetermined timed relationship with the movement of the checking finger 74 and the gear retaining lever 48.

In order to insure immediate advancing movement of a gear from the checking position after the checking operation has been completed and the stop finger 52 has been withdrawn, an injection mechanism shown in Figs. 2, 3, 4, 8, and 10 is provided. This mechanism includes a lever 208 pivotally mounted between the rack members by means of a pin 210. An adjustable screw member 212 is threaded into a lug 214 formed on the extension 206 of the bracket 58, which screw member is adapted to engage a depending tab portion 216 of the lever 208. Thus, as the bracket 58 is pivoted to withdraw the stop finger 52, the screw member 212 rises into engagement with the tab portion 216 of the lever 208 and causes the lever 208 to pivot in a clockwise direction as viewed in Fig. 3. As the lever 208 pivots in a clockwise direction the forward corner 218 thereof engages the gear and starts the gear on its continued movement down the chute. As will be understood, the lever 208 automatically drops to the position shown in Fig. 3 to avoid interference with the next gear coming down the chute when the lever 58 has been pivoted to return the stop finger 52 to its operative position.

In accordance with an important feature of the present invention the above mentioned means 22 is provided for separating acceptable gears from unacceptable or rejected gears after the checking operation has been completed. As shown best in Fig. 1 this means includes a chute 220 which may be of any suitable construction and which provides a continuation of the chute section 32. In addition, a chute 222 is provided which communicates through an opening 224 with the interior of the chute 220. A gate member 226 is pivotally mounted as at 228, whereby the gate member may be moved to close the opening 224 and direct acceptable gears down the chute 220 or to uncover the opening 224 and direct rejected gears down the chute 222. The gate is moved to either the solid or broken line position shown in Fig. 1 by means of a solenoid 230 having the plunger 232 thereof pivotally connected with a lever 234, which lever is rigidly connected to the gate. In order automatically to energize the solenoid 230 in response to the results of a gear checking operation, an electric gage head 236 is mounted on the apparatus frame as shown best in Figs. 4 and 8. This electric gage head may be of any known construction which includes a spring-biased plunger 238 which is operable to close switch means, not shown, to complete a circuit including wires 240 and 242 and energize the solenoid. Preferably the solenoid is constructed so as to move the gate to the solid line position shown in Fig. 1 when de-energized and to move the gate to the broken line position when energized. As shown in Fig. 4, the above described lever 126 is provided with a finger portion 244 for actuating the plunger 238 of the electric gage head. Thus, if a gear being checked by the finger 74 is either over or under sized so as to be unacceptable the lever means 126 actuates the electric gage head so as to energize the solenoid 230 and open the gate 226 so that the unacceptable gear is directed down the chute 222 and into the container 26. Preferably the electric gage head is of the type including suitable adjusting or calibrating means having knobs 243 and 245 so that the head may be adjusted to accommodate gears of different sizes.

In accordance with another feature of this invention the above mentioned means 28 is provided for automatically stopping the gear forming or shaping machine, such as a shaving machine, whenever the results of the checking operation indicate that the machine requires adjustment. More specifically, the means 28 is constructed so that it will stop the machine if more than a certain, but adjustable number of gears, are rejected in succession and also if the percentage of rejections is too high. The means 28 includes an electric control panel 246 in which is mounted an adjustable and automatically resettable counting or stepping relay 248. In order to count the rejected gears the relay 248 is connected to a microswitch 250 through wires 252 and 254. A pivotally mounted lever 256 extends within the chute 222 so that as each gear passes down the chute 222 the lever 256 is depressed and the micro-switch 250 is closed to energize the relay 248. In addition, the relay is similarly connected by means of wires 258 and 260 to a micro-switch 262, which switch is adapted to be actuated by a pivotally mounted lever 264 extending into the chute 220. Thus, each time a rejected gear passes down the chute 222 the relay 248 moves ahead one step and each time an acceptable gear passes down the chute 220 the relay is reset. However, if a predetermined number of gears are rejected without an acceptable gear therebetween the relay 248 is adapted to energize a circuit including wires 266 and 268, which circuit controls a gear forming machine stop relay, not shown. The counting relay 248 is of known commercial construction and therefore need not be set forth in detail. In addition, the relay 248 should be of the type which can be adjusted so as to stop the gear forming machine whenever the number of consecutively rejected gears falls within the range including one and a higher number such as 10.

The electric control panel 246 also includes counting relays 270 and 272 which are also of known commercial construction and which are similar to the relay 248. The relays 270 and 272 are electrically interconnected with each other and with the micro-switches 250 and 262 so that they function to energize the circuit including wires 266 and 268 to stop the gear forming machine whenever a certain percentage of a given number of gears are rejected. The relays 270 and 272 are also adjustable and the relay 270, for example, may be used to determine the permissible number of rejects for a certain quantity or range of gears while the relay 272 may be used to adjustably set the range.

From the above description it is seen that the novel apparatus of this invention, which is preferably operated to check gears at a slightly faster rate than the gears are produced by the forming machine, is capable of automatically and substantially continuously checking a series of gears and like articles for size without requiring individual handling of the gears by an operator. More specifically, it is seen that the checking apparatus, which has its motor continuously energized, is capable of receiving a series of gears from a conveyor or any other suitable source of supply, automatically and successively advancing the gears to a checking position, automatically locating and checking the gears in said checking position and subsequently automatically separating the acceptable gears from the unacceptable gears. It is also seen that the present invention has provided an apparatus for not only automatically checking the gears but also for automatically stopping the gear forming machine tool such as a shaving or hobbing machine in the event the results of the checking operation indicate an adjustment of the machine is necessary.

While the preferred embodiment of the present invention has been shown and described herein, it is obvious that many structural details may be changed without departing from the spirit and scope of the appended claims.

The invention is claimed as follows:

1. An apparatus for checking gears and the like comprising means for receiving a gear from a source of supply and for automatically locating the gear in predetermined position with the gear tooth spaces in predetermined arrangement, gear delivery control means operable in timed relation with said locating means, and means operable in timed relationship with said locating means for entering a tooth space of and checking said located gear.

2. An apparatus for checking gears and the like comprising means for receiving a gear from a source of supply and automatically locating the gear in predetermined position, said locating means including toothed means adapted to mesh with said gear to insure predetermined arrangement of the gear tooth spaces, and means operable in timed relationship with said locating means for checking the located gear.

3. An apparatus for checking gears and the like comprising means for receiving a gear from a source of supply and automatically locating the gear in predetermined position, said means including rack means for meshing with a gear moving from said source of supply to said predetermined position to insure predetermined arrangement of the gear tooth spaces, and means operable in timed relationship with said locating means for checking the located gear.

4. An apparatus for checking gears and the like comprising rack means along which a gear to be checked may be moved to a predetermined position, means for stopping and holding the gear at said predetermined position, means for checking a gear at said predetermined position, and means for disengaging said stop and holding means from the gear after the gear has been checked to permit the gear to pass from said predetermined position.

5. An apparatus for checking gears and the like comprising means for receiving a gear from a source of supply and for automatically locating the gear in predetermined position with the gear tooth spaces in predetermined arrangement, means for restraining a supply of gears and for automatically releasing the gears one at a time for movement to said locating means and in timed relation therewith, and gauge means operable in timed relationship with said locating means for projecting into generally oppositely disposed tooth spaces of successively located gears to check the same.

6. An apparatus for checking gears and the like comprising means for receiving a gear from a source of supply and for automatically locating the gear in predetermined position with the gear tooth spaces in predetermined arrangement, gear delivery control means operable in timed relation with said locating means, and gauge means including a pair of relatively movable finger members operable in timed relationship with said locating means for projecting into generally oppositely disposed tooth spaces of successively located gears to check the same.

7. An apparatus for checking gears and the like comprising means for receiving a gear from a source of supply and for automatically locating the gear in predetermined position with the gear tooth spaces in predetermined arrangement, and means for checking a located gear, said last mentioned means including fixed finger means disposed for projecting into a tooth space of the located gear, generally oppositely disposed movably mounted finger means, and means for actuating said movably mounted finger means in timed relationship with said locating means.

8. An apparatus of the type described comprising means for receiving a plurality of gears from a source of supply, means for successively locating the gears in a predetermined position with the gear tooth spaces in predetermined arrangement, gear delivery control means operable in timed relation with said locating means, gauge means for successively entering tooth spaces of gears located in said predetermined position, means for automatically directing acceptable gears from said predetermined position and along one path of travel, and means for automatically directing unacceptable gears from said predetermined position and along a second path of travel, the directing means being responsive to said gauge means.

9. An apparatus for use in combination with a machine for making gears and the like, which apparatus comprises means for successively receiving gears from said machine and for locating the gears in a predetermined position with the gear tooth spaces in predetermined arrangement, gauge means operable in timed relationship with said locating means for dimensionally checking the gear located at said predetermined position, means responsive to said gauging means for selectively directing gauged gears along predetermined paths, and circuit control means operable as an incident to the selective direction of gears after a predetermined number of gears have been directed along one of said paths.

10. Apparatus as claimed in claim 9, wherein the circuit control means is operable in response to the movement of gears along one of said paths.

11. An apparatus for use in combination with a machine for making gears and the like, which apparatus comprises means for successively receiving gears from said machine and for locating the gears in a predetermined position with the gear tooth spaces in predetermined arrangement, gauge means operable in timed relationship with said locating means for dimensionally checking the gear located at said predetermined position, means responsive to said gauging means for selectively directing gauged gears along predetermined paths, one path for receiving acceptable gauged gears and another path for receiving the other gauged gears, and control means operable as an incident to the selective direction of gauged gears along the last mentioned path.

References Cited in the file of this patent

UNITED STATES PATENTS

| | | |
|---|---|---|
| 2,352,091 | Fedorchak et al. | June 20, 1944 |
| 2,393,246 | Hallowell | Jan. 22, 1946 |
| 2,407,062 | Darrah | Sept. 3, 1946 |
| 2,474,482 | Lovick | June 28, 1949 |
| 2,531,317 | Baney et al. | Nov. 21, 1950 |
| 2,561,534 | Parker et al. | July 24, 1951 |
| 2,569,564 | Gulliet | Oct. 2, 1951 |
| 2,664,557 | Sargrove | Dec. 29, 1953 |

OTHER REFERENCES

"Continuous Gear Production" by C. E. Scott; "Automation," April 1955, pages 47–53.

"Continuous Blank Machining in Gear Production," by J. J. McCabe, "Automation," June 1955, pp. 26–29.